United States Patent Office 3,103,437
Patented Sept. 10, 1963

3,103,437
HARDENING OF PHOTOGRAPHIC EMULSIONS WITH ORGANIC DIISOCYANATES
Richard W. Henn and Donald M. Burness, Rochester, N.Y., assignors to Eastman Kodak Company, Rochester, N.Y., a corporation of New Jersey
No Drawing. Filed Apr. 10, 1959, Ser. No. 805,357
4 Claims. (Cl. 96—111)

This invention relates to the hardening of photographic emulsions with organic diisocyanates containing 2 or more isocyanate groups separated by at least 2 carbon atoms. This hardening may be accomplished either by incorporating the hardener into the emulsion or by treating a layer of the emulsion with a solution containing the isocyanate.

Photographic film is prepared by coating a photosensitive gelatin-silver halide emulsion onto a transparent film base. When silver halide emulsion is coated onto paper base, photographic paper results. It has been the practice in the making of photographic products to treat the photographic emulsions either prior to coating or after coating with a hardening agent so as to reduce the tendency thereof to soften during processing, particularly at elevated temperatures.

Compounds which have been used for hardening silver halide emulsions have been principally of the aldehyde type such as formaldehyde, hydroxyaldehydes, glyoxal or mixtures of aldehydes with aromatic compounds containing at least 1 nuclear hydroxy constituent group such as phenol, resorcinol and the like. Although the aldehydes have usually proved to be satisfactory as hardening agents, undesirable effects have been noted in some cases. Some of the effects which might be produced by aldehydes when employed as hardeners in photographic emulsions are excessive fogging, desensitization, flattening of gradation in the processed film and the like. Hardeners which function by the liberation of formaldehyde also exhibit deleterious effects, such as continued hardening upon storage known as "after hardening."

One object of our invention is to harden gelatin-silver halide photographic emulsion layers without any adverse effect, photographically, upon the emulsion and without posthardening occurring. Another object of our invention is to provide photographic emulsion layers with a small proportion of an organic isocyanate to enhance the resistance thereof to aqueous solutions at elevated temperatures. Other objects of our invention will appear herein.

We have found that certain organic isocyanates are particularly effective when incorporated in or applied to gelatin-silver halide emulsions in rendering the layers thereof resistant under moist conditions to undue temperatures and to undue swelling. We have found that of the organic isocyanates those containing at least 2 isocyanate groups separated by at least 2 carbon atoms to be particularly useful for hardening purposes. These isocyanate groups may be joined either by an aliphatic chain of 2 or more carbon atoms or by attaching the isocyanate groups to an aromatic structure so that the isocyanate groups are thus separated. The bisulfite addition products of these isocyanates are particularly useful as they exhibit good solubility properties and resist reaction with water. The hardeners, in accordance with our invention, are usually supplied to the photographic emulsion in the form of an aqueous solution, although where appropriate, non-aqueous solvents may be employed. Compounds which have been found to be especially useful as hardeners for photographic emulsions in accordance with our invention are hexamethylene diisocyanate, octamethylene diisocyanate, tolyl diisocyanate and the bisulfite adducts thereof.

Our method includes any convenient method of supplying the isocyanate to the photographic emulsion. For instance, the isocyanate may be incorporated in the photographic emulsion prior to coating out that emulsion upon a support therefor, such as photographic film base, paper, cloth or other support to which the emulsion layer will adhere. Another convenient way of supplying the diisocyanate to the photographic emulsion is by first coating out a layer of the emulsion in unhardened form upon the support and applying a solution of the diisocyanate thereto either as a bath prior to processing or by incorporating diisocyanate hardener in the developing bath. When the hardener is supplied in the form of a solution to a layer of the photographic emulsion, it is conveniently used in 0.5–5% concentration. If the isocyanate is to be incorporated in the photographic emulsion it may, for instance, be used in an amount within the range of 5–30 milligrams per gram of gelatin therein. It has been found that the photographic emulsion layer hardened with isocyanate hardener is resistant to softening upon processing in aqueous baths even at elevated temperatures such as at 90–100° F. and under a wide range of pH conditions. It has also been found that photographic emulsions hardened in accordance with our invention do not continue to harden upon storage to a point where brittleness or "blocking" occurs.

The following examples illustrate the hardening of photographic emulsion layers in accordance with our invention.

*Example 1*

The bisulfite adduct of tolyl diisocyanate was dissolved in water to make a 2% solution. A film, the photosensitive layer of which was a gelatin-silver halide emulsion was exposed, bathed in the solution of tolyl diisocyanate adduct for 90 seconds, developed in D–72 developer for 60 seconds, fixed in an aqueous sodium thiosulfate fixing solution and washed at 90° F. A control film was given similar treatment except that a bath of distilled water was substituted for the solution of diisocyanate. The control swelled rapidly in water and was melting badly after immersion for 90 seconds. The treated film showed little or no swelling after immersion in water for 20 minutes. It also withstood immersion in boiling water for 5 minutes and there was no sign of melting when the film was withdrawn from the boiling water at the end of this period.

*Example 2*

A bath was prepared having the following composition: Elon 10 grams, hydroquinone 20 grams, potassium bromide 4 grams, tolyl diisocyanate bisulfite adduct 20 grams, and water to make 1 liter. A similar bath was prepared but without isocyanate. Two pieces of film having thereon a gelatin-silver halide photosensitive layer were exposed and these films were separately immersed in the respective developing baths for 90 seconds and then for 60 seconds in a bath containing sodium sesquicarbonate 50 grams, sodium sulfite 50 grams, and water to make 1 liter. The image appeared rapidly and substantially equally in each case. The two films were then fixed in a non-hardening sodium thiosulfate water solution and were immersed in wash water at 90° F. The film which had been immersed in the developing bath without isocyanate was found to have melted severely when removed after 60 seconds' wash while in contrast the film which had been immersed in the developer containing the isocyanate was in excellent condition after washing for 30 minutes. This film was also relatively unaffected upon immersion in boiling water for 10 minutes.

Example 3

Unexposed gelatin-silver halide photographic films were bathed in the initial solutions of Examples 1 and 2 for 90 seconds and then dried. There was thus obtained film #1 with no addition of hardener, film #2 containing tolyl diisocyanate, film #3 containing developer agent and antifoggant but no isocyanate and film #4 containing developing agent, antifoggant and isocyanate. All films were given normal exposure to a test object. Films 1 and 2 were processed in Kodak developer D-72, fixed in sodium thiosulfate-water solution and washed with 90° F. wash water. Film #2 which had been treated with the isocyanate withstood washing for 20 minutes without signs of melting and withstood immersion in boiling water in contrast to film #1 which exhibited melting in the washing operation. Films #3 and #4 were developed by immersion in the alkaline bath described in Example 2. The image on both films appeared rapidly and developed completely. After fixing, film #4 showed essentially no swelling on prolonged immersion in either 90° F., wash water or boiling water whereas film #3 largely sloughed off after 90 seconds in 90° F. wash water.

Example 4

A developer was prepared having the following composition: 1,2,4-triaminophenol hydrochloride 5 grams, sodium bisulfite 12 grams, sodium sulfite 3 grams, tolyl diisocyanate bisulfite adduct 10 grams and water to make 1 liter. A similar developing solution was prepared but without the addition of the isocyanate. The pH of the developer was raised to 5.0 by adding potassium hydroxide thereto in both cases. A gelatin-silver halide emulsion sensitized film was exposed and also developed in the first solution for 60 seconds and was then transferred to an alkaline bath made up of sodium metaborate 50 grams, potassium bromide 100 grams and water to make 1 liter, and the film was kept in this bath for 30 seconds and then fixed and washed. The film thus prepared strongly resisted warm wash water remaining relatively unswollen even after 1 hour and also withstood immersion in boiling water. A second film was treated similarly except that it was immersed in the alkali bath for 16 seconds. This film also stayed in good condition. Film, however, which had been sensitized with an unhardened layer of gelatin-silver halide emulsion was developed in developer without isocyanate. The emulsion layer melted very soon after immersion of the film in warm wash water.

Example 5

Strips of photographic film, the emulsion layer of which was unhardened were immersed in a 2% solution of hexamethylene diisocyanate bis(potassium bisulfite) for 2 minutes and were then transferred to an alkali bath containing 50 grams of sodium carbonate and 8 grams of sodium hydroxide per liter of water for 1 minute. This film withstood 90° F. wash water very well and also was resistant to melting upon immersion in boiling water.

Example 6

A solution was prepared at 5% concentration of tolyl diisocyanate bisulfite adduct which was added to a gelatin-silver bromoiodide photographic emulsion in the proportion of 80 ml. per mole of silver. The emulsion was coated out onto photographic paper base free of chemicals which might have a hardening action on the gelatin of the emulsion. A coating of like emulsion to which no tolyl diisocyanate bisulfite was added was applied to paper base for comparison.

The two papers thus prepared were subjected to 25 second development at 90° F. in Kodak X-ray Developer. The coating containing the tolyl diisocyanate bisulfite hardened sufficiently that it successfully resisted abrasion and scratching when subjected to fixing for 5 minutes in F-5 fixing bath and washing in water at 70° F. for 15 minutes. The comparison coating showed many scratches and abrasion marks when processed in like manner.

It has been found in hardening photographic emulsions with isocyanates that the developing or other alkaline bath employed subsequent to the treatment of the photographic emulsion with isocyanate may also contain in addition to alkaline materials an alkali metal sulfate. It has been found that the presence of the sulfate results in even less swelling of the emulsion layer than where that sulfate has been omitted. For instance, photographic film having an unhardened emulsion layer thereon was treated with a 2% solution of tolyl diisocyanate bisulfite adduct for 2 minutes and 1 sample was treated for 2 minutes with a 5% sodium carbonate solution and another was treated with a solution of 1% sodium carbonate and 15.5% sodium sulfate. The swelling in tap water was measured in the case of the two films. Whereas the swelling where only sodium carbonate was used and the film was held in tap water for about 4 minutes was 64 microns increase over the dry thickness, the corresponding swelling when using an alkaline bath containing sodium sulfate also was only 39.

The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and as antifoggants in higher amounts, as described in Trivelli and Smith U.S. Patents 2,566,245, issued August 28, 1951, and 2,566,263, issued August 28, 1951.

The emulsions can also be chemically sensitized with gold salts as described in Waller et al. U.S. Patent 2,399,083, issued April 23, 1946, or stabilized with gold salts as described in Damschroder U.S. Patent 2,597,856, issued May 27, 1952, and Yutzy and Leermakers U.S. Patent 2,597,915, issued May 27, 1952. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued November 15, 1949), polyamines, such as diethyl triamine (Lowe and Jones U.S. Patent 2,518,698, issued August 15, 1950), polyamines, such as spermine (Lowe and Allen U.S. Patent 2,521,925, issued September 12, 1950), or bis($\beta$-aminoethyl)sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,-854, issued January 9, 1934; White U.S. Patent 1,990,-507, issued February 12, 1935; Brooker and White U.S. Patents 2,112,140, issued March 22, 1938; 2,165,338, issued July 11, 1939; 2,493,747, issued January 10, 1950, and 2,739,964, issued March 27, 1956; Brooker and Keyes U.S. Patent 2,493,748, issued January 10, 1950; Sprague U.S. Patents 2,503,776, issued April 11, 1950, and 2,519,001, issued August 15, 1950; Heseltine and Brooker U.S. Patent 2,666,761, issued January 19, 1954;

Heseltine U.S. Patent 2,734,900, issued February 14, 1956; VanLare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; the triazoles of Heimbach and Kelly U. S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948, and 2,450,397, issued September 28, 1948; Heimbach and Clark U.S. Patent 2,444,609, issued July 6, 1948; Allen and Reynolds U.S. Patents 2,713,541, issued July 19, 1955, and 2,743,181, issued April 24, 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956, and those disclosed by Birr in "Z. wiss. Phot.," vol. 47, 1952, pages 2–28; the disulfides of Kodak Belgian Patent 569,317, issued July 31, 1958; the quaternary benzothiazolium compounds of Brooker and Staud U.S. Patent 2,131,038, issued September 27, 1938, on the polymethylene bis-benzothiazolium salts of Allen and Wilson U.S. Patent 2,694,716, issued November 16, 1954; or the zinc and cadmium salts of Jones U.S. Patent 2,839,405, issued June 17, 1958.

The emulsions may also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,384, issued November 23, 1943; and the polyethylene glycol type of Carroll and Beach U.S. Patent 2,708,162, issued May 10, 1955.

The emulsions may contain a suitable gelatin plasticizer such as glycerin; a dihydroxy alkane such as 1,5-pentane diol as described in Milton and Murray U.S. application Serial No. 588,951, filed June 4, 1956; an ester of an ethylene bis-glycolic acid such as ethylene bis(methyl glycolate) as described in Milton U.S. application Serial No. 662,564, filed May 31, 1957; bis(ethoxy diethylene glycol) succinate as described in Gray U.S. application Serial No. 604,333, filed August 16, 1956, or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The emulsions may contain a coating aid such as saponin; a lauryl or oleyl monether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Kox, Stenberg and Wilson U.S. Patent 2,843,487, issued July 15, 1958; a water-soluble maleopimarate or a mixture of a water-soluble maleopimarate and a substituted glutamate salt as described in Knox and Fowler U.S. Patent 2,823,123, issued February 11, 1958; an alkali metal salt of a substituted amino acid such as disodium N(carbo-p-tert. octylphenoxypentaethoxy)-glutamate as described in Knox and Wilson U.S. patent application Serial No. 600,679, filed July 30, 1956; or a sulfosuccinamate such as tetrasodium N-(1,2-dicarboxyethyl)-N-octadecyl sulfosuccinamate or N-lauryl disodium sulfosuccinamate as described in Knox and Stenberg U.S. patent application Serial No. 691,125, filed October 21, 1957.

The addenda which we have described may be used in various kinds of photographic emulsions. In addition to being useful in X-ray and other nonoptically sensitized emulsions they may also be used in orthochromatic, panchromatic, and infrared sensitive emulsions. They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packed type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,698,236, issued December 28, 1954, and 2,543,181, issued February 27, 1951; and Yackel et al. U.S. patent application Serial No. 586,705, filed May 23, 1956. They may also be used in color transfer processes which utilize the diffusion transfer of an image-wise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,933 and 554,934, granted August 12, 1957; International Polaroid Belgian Patents 554,212, granted July 16, 1957, and 554,935, granted August 12, 1957; Yutzy U.S. Patent 2,756,142, granted July 24, 1956, and Whitmore and Mader U.S. patent application Serial No. 734,141, filed May 9, 1958.

In the preparation of the silver halide dispersions employed for preparing silver halide emulsions, there may be employed as the dispersing agent for the silver halide in its preparation, gelatin or some other colloidal material such as colloidal albumin, a cellulose derivative, or a synthetic resin, for instance, a polyvinyl compound. Some colloids which may be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued August 24, 1943; a water-soluble ethanolamine cellulose acetate as described in Yutzy U.S. Patent 2,322,085, issued June 15, 1943; a polyacrylamine having a combined acrylamide content of 30–60% and a specific viscosity of 0.25–1.5 on an imidized polyacrylamide of like acrylamide content and viscosity as described in Lowe, Minsk and Kenyon U.S. Patent 2,541,474, issued February 13, 1951; zein as described in Lowe U.S. Patent 2,563,791, issued August 7, 1951; a vinyl alcohol polymer containing urethane carboxylic acid groups of the type described in Unruh and Smith U.S. Patent 2,768,154, issued October 23, 1956; or containing cyano-acetyl groups such as the vinyl alcohol-vinyl cyanoacetate copolymer as described in Unruh, Smith and Priest U.S. Patent 2,808,331, issued October 1, 1957; or a polymeric material which results from polymerizing a protein or a saturated acylated protein with a monomer having a vinyl group as described in U.S. Patent 2,852,382, of Illingsworth, Dann and Gates, issued September 16, 1958.

If desired, compatible mixtures of two or more of these colloids may be employed for dispersing the silver halide in its preparation. Combinations of these antifoggants, sensitizers, hardeners, etc., may be used.

We claim:

1. A gelatin-silver halide photographic emulsion containing therein a bisulfite adduct of an organic diisocyanate whose isocyanate groups are separated by a hydrocarbon chain of at least two carbon atoms.

2. A gelatin-silver halide photographic emulsion containing therein a bisulfite adduct of tolyl diisocyanate.

3. A gelatin-silver halide photographic emulsion containing therein a bisulfite adduct of hexamethylene diisocyanate.

4. A method of hardening a gelatin-silver halide photographic emulsion layer upon a support therefor which comprises treating the layer with an aqueous solution of a bisulfite adduct of an organic diisocyanate whose isocyanate groups are separated by a hydrocarbon chain of at least two carbon atoms, and subsequently treating the layer with an aqueous alkaline bath containing an alkali metal sulfate in solution therein.

References Cited in the file of this patent

UNITED STATES PATENTS

| | | |
|---|---|---|
| 1,941,852 | Brunken | Jan. 2, 1934 |
| 2,284,896 | Hanford et al. | June 2, 1942 |
| 2,381,063 | Kung | Aug. 7, 1945 |
| 2,403,327 | Baker | July 2, 1946 |
| 2,592,263 | Frome | Apr. 8, 1952 |
| 2,614,930 | Lowe et al. | Oct. 31, 1952 |
| 2,708,642 | Doser | May 17, 1955 |
| 2,710,816 | Evans et al. | June 14, 1955 |
| 2,897,094 | Hayes et al. | July 28, 1959 |